(12) United States Patent
Nuzzi (10) Patent No.: US 9,824,357 B2
(45) Date of Patent: *Nov. 21, 2017

(54) FOCUS-BASED CHALLENGE-RESPONSE AUTHENTICATION

(71) Applicant: PAYPAL, INC., San Jose, CA (US)

(72) Inventor: Frank Anthony Nuzzi, Pflugerville, TX (US)

(73) Assignee: PAYPAL, INC., San Jose, CA (US)

( * ) Notice: Subject to any disclaimer, the term of this patent is extended or adjusted under 35 U.S.C. 154(b) by 444 days.

This patent is subject to a terminal disclaimer.

(21) Appl. No.: 14/510,777

(22) Filed: Oct. 9, 2014

(65) Prior Publication Data

US 2015/0026068 A1 Jan. 22, 2015
US 2017/0300902 A9 Oct. 19, 2017

Related U.S. Application Data

(63) Continuation of application No. 13/914,913, filed on Jun. 11, 2013, now Pat. No. 8,893,229, which is a continuation of application No. 13/153,100, filed on Jun. 3, 2011, now Pat. No. 8,621,564.

(51) Int. Cl.
*H04L 29/06* (2006.01)
*G06Q 20/40* (2012.01)
*G06F 21/31* (2013.01)
*G06F 21/36* (2013.01)

(52) U.S. Cl.
CPC ........... *G06Q 20/401* (2013.01); *G06F 21/31* (2013.01); *G06F 21/36* (2013.01); *H04L 63/08* (2013.01); *H04L 63/083* (2013.01); *G06F 2221/2103* (2013.01); *G06F 2221/2133* (2013.01)

(58) Field of Classification Search
CPC .. G06F 21/31; G06F 21/36; G06F 2221/2103; G06F 2221/2133; H04L 63/08; H04L 63/083; G06C 20/401
USPC .......................................................... 726/2
See application file for complete search history.

(56) References Cited

U.S. PATENT DOCUMENTS

| 2008/0291202 | A1 | 11/2008 | Minhas et al. | |
|---|---|---|---|---|
| 2009/0150983 | A1* | 6/2009 | Saxena | G06F 21/36 726/7 |
| 2011/0314537 | A1* | 12/2011 | Hulten | G06F 21/31 726/17 |

\* cited by examiner

*Primary Examiner* — Yogesh Paliwal
(74) *Attorney, Agent, or Firm* — Haynes and Boone, LLP (57) ABSTRACT

A method for authenticating an access attempt includes detecting an access attempt by a user device over a network. A challenge-response authentication is provided over the network to the user device. The challenge-response authentication includes an image having a plurality of image objects. The challenge-response authentication is operable to display the image such that at least one of the plurality of image objects is in focus and at least one of the plurality of image objects is not in focus. In response to providing the challenge-response authentication, an authentication response is received from the user device over the network, and it is determined whether the authentication response includes an indication of the at least one of the plurality of image objects that is in focus to determine whether to authenticate or deny the access attempt.

20 Claims, 10 Drawing Sheets

FOCUS-BASED CHALLENGE-RESPONSE AUTHENTICATION

CROSS-REFERENCE TO RELATED APPLICATIONS

This application is a continuation of U.S. patent application Ser. No. 13/914,913, filed Jun. 11, 2013, now U.S. Pat. No. 8,893,229, issued on Nov. 18, 2104, which in turn is a continuation of U.S. patent application Ser. No. 13/153,100, filed Jun. 3, 2011, now U.S. Pat. No. 8,621,564, issued on Dec. 31, 2013, the disclosures of which are incorporated herein by reference in their entirety.

BACKGROUND

Field of the Disclosure

The present disclosure generally relates to online and/or mobile payments and more particularly to a focus-based challenge-response authentication system that may be used with an online and/or mobile payment system.

Related Art

More and more consumers are purchasing items and services over electronic networks such as, for example, the Internet. Consumers routinely purchase products and services from merchants and individuals alike. The transactions may take place directly between a conventional or online merchant or retailer and the consumer, and payment is typically made by entering credit card or other financial information. Transactions may also take place with the aid of an online or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why online and/or mobile purchases are growing very quickly.

In many aspects of online and/or mobile payments, as well as in many situations where online and/or mobile payments are not involved, it may be desirable to authenticate a user attempting to access a website, application, and/or other network service. Authentication is performed to ensure that the entity interacting with the website, application, and/or other network service is not autonomous program running on a computer (e.g., a 'bot',) and may be desired by website, application, or other network operators to protect against such bots generating spam (e.g., by posting spam on a message board or other social communication application,) signing up as users (e.g., signing up as a user of a message board or other social communication application, signing up for an email address, etc.,) and/or performing a variety of other bot actions know in the art.

Conventional authentication methods provide word(s) and/or groups of characters to an entity attempting to access a website, application, or other network service, and require the entity to type in the word(s) or groups of characters in order to be authenticated and gain access to the website, application, and/or network service. The words and/or groups of characters may be distorted or warped, obscured (e.g., with an angled line drawn through them), crowded (positioned closer together than is customary for ordinary reading,) and/or subject to a variety of other attributes known in the art of word/character authentication methods. In some instances, words that have been scanned from books or other similar physical documents and that have previously presented problems to Optical Character Recognition (OCR) programs are used. While such conventional authentication methods have been somewhat successful at preventing bot access to websites, applications, and/or network systems, they have also proven to provide various difficulties to humans attempting to access the website, application, or network through a computer.

Thus, there is a need for an improved challenge-response authentication system.

SUMMARY

According to one embodiment, a method for authenticating an access attempt includes providing a challenge-response authentication that is operable to display an image such that at least one of a plurality of image objects is in focus and at least one of the plurality of image objects is not in focus. An authentication response that is received in response to providing the challenge-response authentication is analyzed to determine whether it includes an indication of the at least one of the plurality of image objects that is in focus and, if so, the access attempt is authenticated.

In an embodiment, a focal point of the image may be changed using a predetermined time schedule to change which of the plurality of image objects is/are in focus during the challenge-response authentication such that a user performing the access attempt is presented with an image in which different image objects are in focus over time.

As a result, a challenge-response authentication is provided that provides substantial difficulties for autonomous programs running on computers making access attempts, but is relatively easy for a human user making the access attempt.

These and other features and advantages of the present disclosure will be more readily apparent from the detailed description of the embodiments set forth below taken in conjunction with the accompanying figures.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for authenticating an attempt to access a website, application, or other network service by a user device over a network. An authentication device is coupled to the network and detects the attempt to access the website, application, or other network service by the user device. The authentication device then provides a challenge-response authentication, which includes an image having a plurality of image objects, over the network to the user device. The challenge-response authentication is operable, e.g., when provided to the user device, to display the image on a user device display such that at least one of the plurality of image objects is in focus and at least one of the plurality of image objects is not in focus. For example, a user may be presented with an image in which different image objects in the plurality of image objects are in focus over time and asked to indicate which of the plurality of image objects is in focus. The user may then use the user device to send an authentication response over the network to the authentication device, and the authentication device will determine whether the authentication response includes an indication of the at least one of the plurality of image objects that is in focus. If the authentication response indicates the correct image object(s) in the image that are known or determined to be in focus by the authentication device, the access attempt is authenticated.

Figure 1:
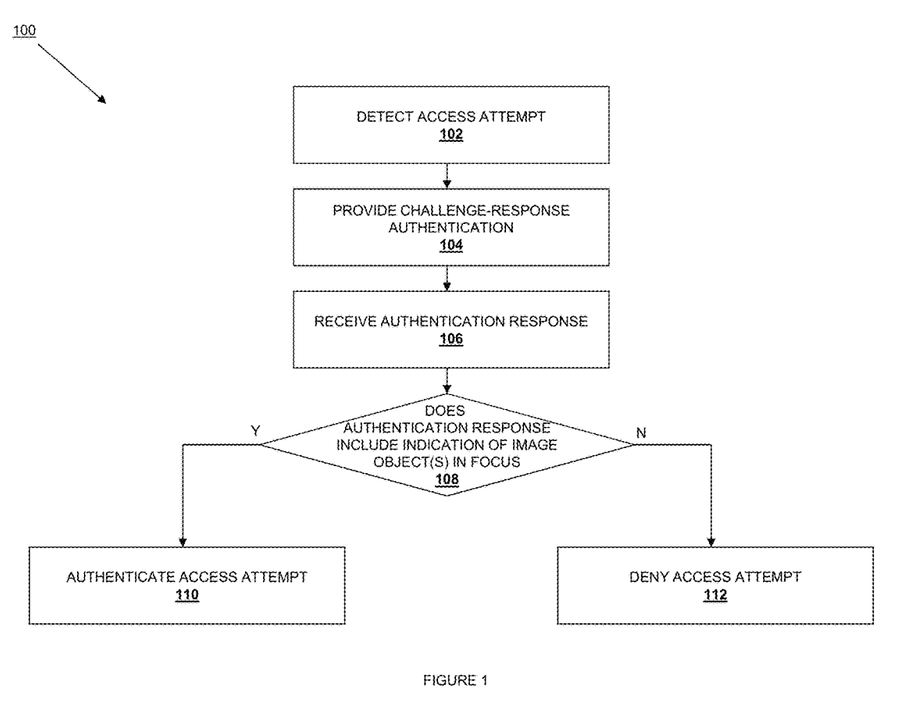
FIG. 1 is a flow chart illustrating an embodiment of a method for authenticating an access attempt.

Referring now to FIG. 1, a method 100 for authenticating an access attempt is illustrated. In the embodiment of the method 100 described below, a user is attempting to access a website, application, and/or other network service that is provided over a network by a payee device, a payment service provider device, an account provider device, and/or other authentication device. In another embodiment, a payment service provider such as, for example, PayPal, Inc. of San Jose, Calif. assists in the making of payments from the payer to the payee by transferring funds from the payer account to a payee account of the payee, and may authenticate access attempts for a number of network service requests using the method 100. However, these embodiments are meant to be merely exemplary, and one of skill in the art will recognize that a variety of modifications may be made to the focus-based challenge-response authentication system and method discussed below without departing from the scope of the present disclosure.

The method 100 begins at block 102 where an access attempt is detected. In an embodiment, at block 102 of the method 100, a user is attempting to access a website, application, and/or a variety of other network services known in the art, over a network using a user device. For example, the user may be attempting to sign up for an account (e.g., a payer account, an email account, an application account, and/or a variety of other accounts known in the art), access a message board or other social communication service, and/or perform a variety of other actions know in the art that may require authentication. The access attempt using the user device results in an access request being sent over the network to an authentication device such that the access attempt is detected by the authentication device. In an embodiment, the authentication device is part of a server or group of servers that are used to provide the website, application, or other network service. In another embodiment, the authentication device may be separate from the server or group of servers that are used to provide the website, application, or other network service, and may be connected to those server(s) through the network.

The method 100 then proceeds to block 104 where a challenge-response authentication is provided. In an embodiment, the authentication device provides the challenge-response authentication to the user device over the network in response to detecting the access request. The challenge-response authentication is provided to prevent access to the website, application, and/or other network service by autonomous programs on a computer (e.g., "bots".) The challenge-response authentication includes an image having a plurality of image objects, and the challenge-response authentication is operable to provide the image on the user device such that only a subset of the plurality of image objects are displayed in focus on a user device display of the user device while the image objects that are not in the subset are displayed out of focus. A plurality of examples of the image and operation of the challenge-response authentication are illustrated and described below, but one of skill in the art will recognize that a variety of other images and challenge-response authentication functionality that provides a focus-based challenge-response authentication will fall within the scope of the present disclosure.

Figure 2A:
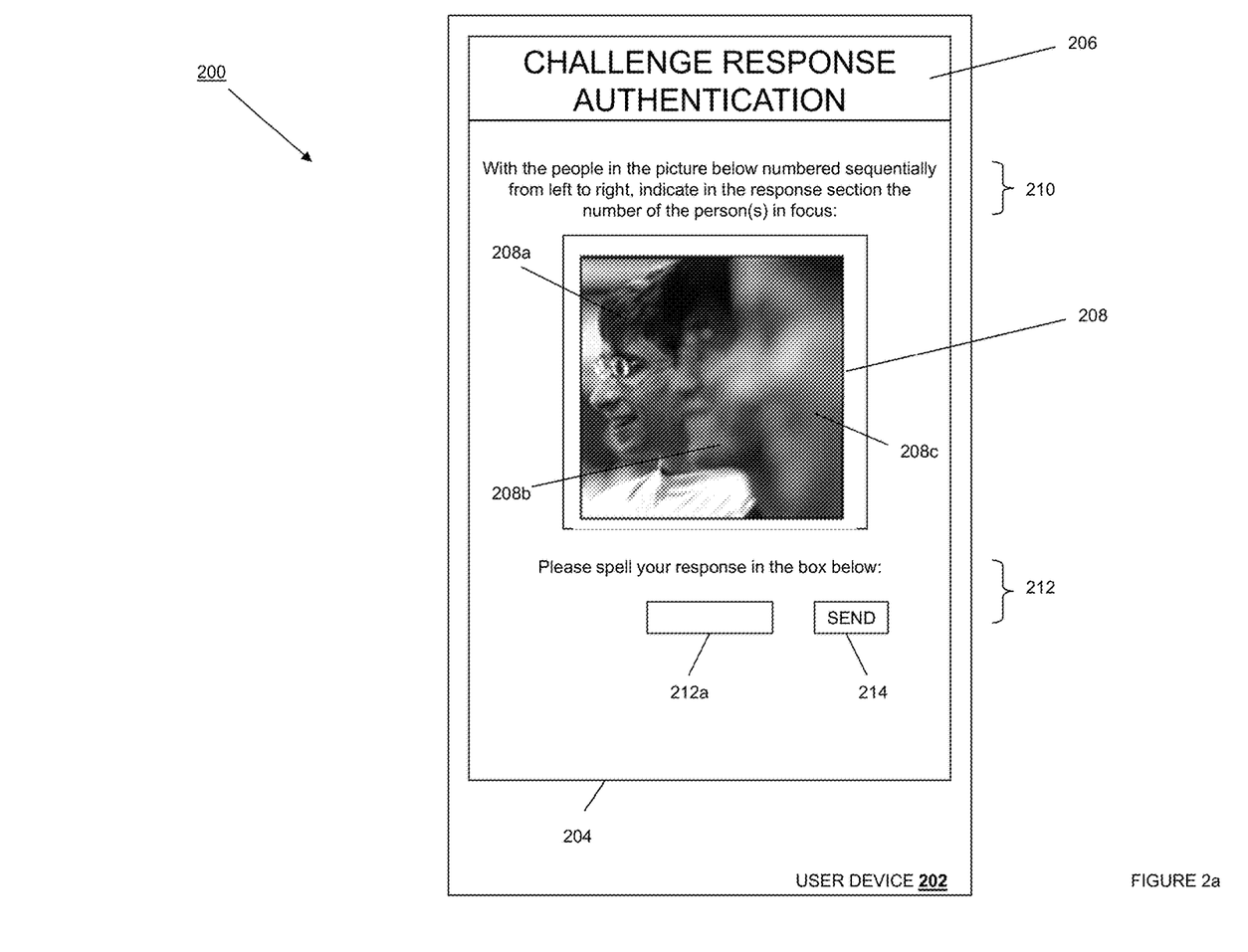
FIG. 2a is a front view illustrating an embodiment of a user device being used to make an access attempt.
Figure 2B:
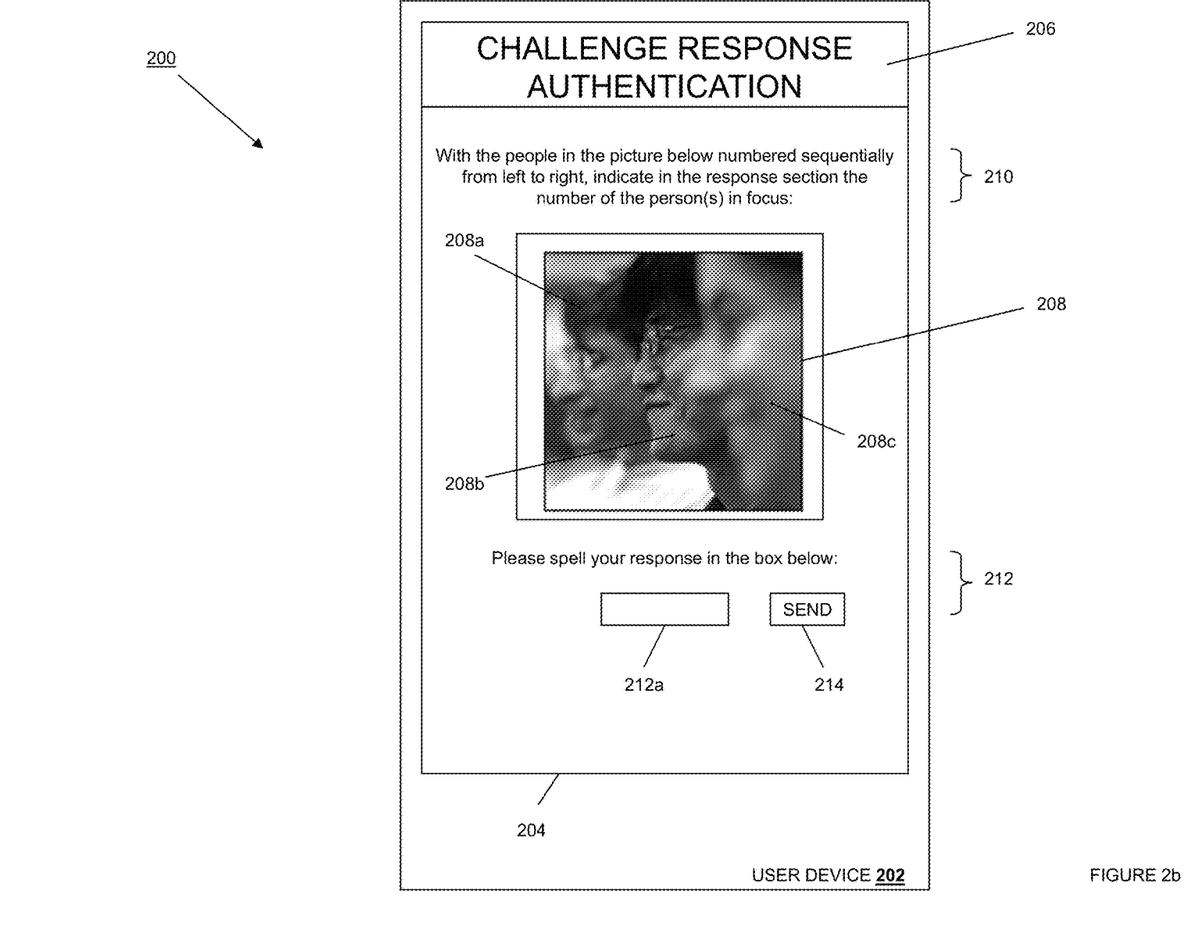
FIG. 2b is a front view illustrating an embodiment of the user device of FIG. 2a being used to make an access attempt.
Figure 2C:
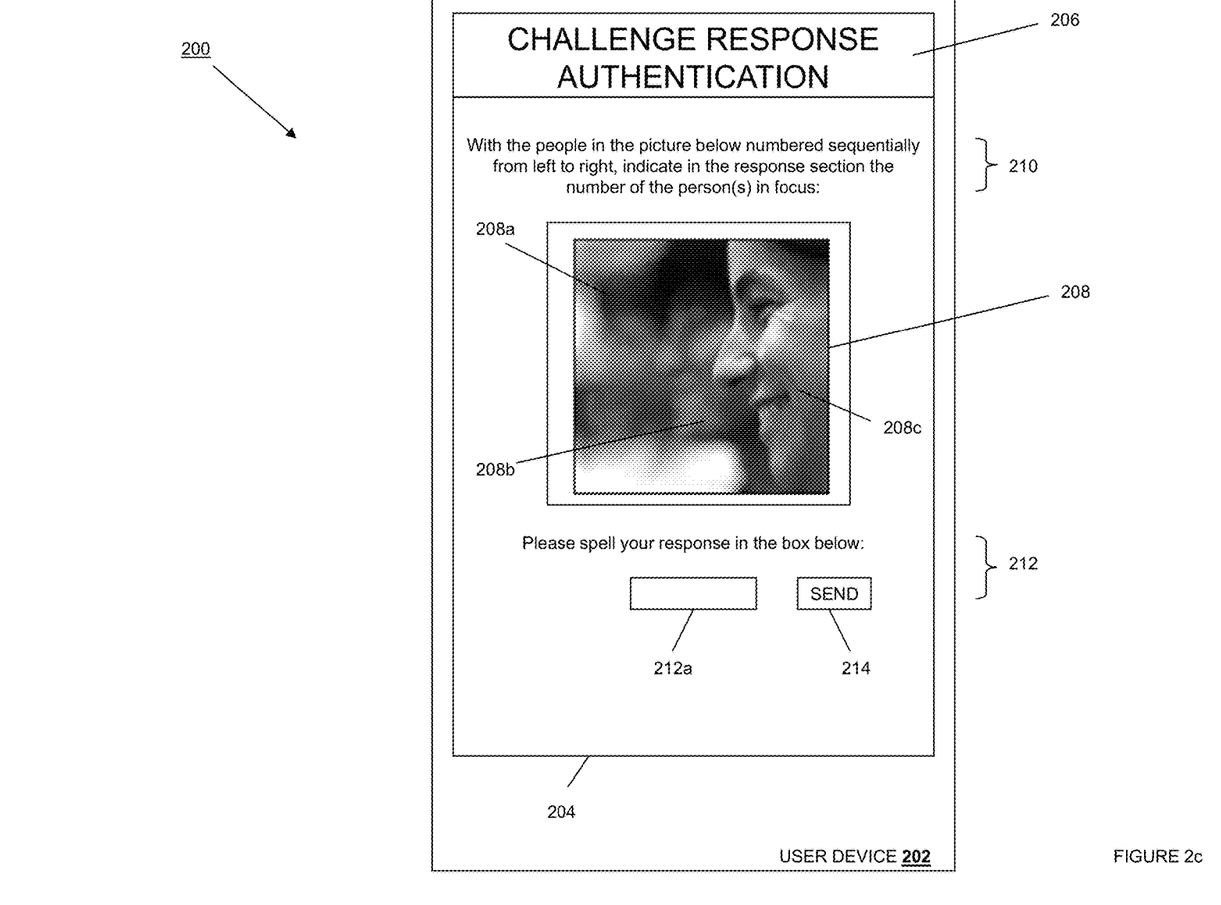
FIG. 2c is a front view illustrating an embodiment of the user device of FIGS. 2a and 2b being used to make an access attempt.

Referring now to FIGS. 2a, 2b, and 2c, an embodiment of a focus-based challenge-response authentication system 200 is illustrated. The focus-based challenge-response authentication system 200 includes a user device 202 having a user device display 204. At block 104 of the method 100, a challenge-response authentication 206 is provided to the user device 200 over a network that includes an image 208.

In the embodiment illustrated in FIGS. 2a, 2b, and 2c, the image 208 is a plenoptic image. Plenoptic images may be created by plenoptic (or light-field) cameras or other imaging devices. In one embodiment, plenoptic cameras use microlens arrays (also known as lenticular lens arrays) that are placed at the focal plane of the cameras main lens, along with an image sensor positioned behind the microlens array. Plenoptic cameras produce an image that allows the displacement of image parts that are not in focus to be analyzed such that depth information can be extracted, when enable the 'virtual' refocusing of the image using a computer (e.g., a processor.) One of skill in the art will recognize that the system and method described to produce a plenoptic image above has been presented as merely of one example of how to do so, and the system and method used to produce the plenoptic image used in the method 100 is not included to limit the scope of the present disclosure.

The challenge-response authentication 206 also includes an instruction section 210, a response section 212, and a send button 214. In the embodiment illustrated in FIGS. 2a, 2b, and 2c, the instruction section 210 includes the following instruction "With the people in the picture below numbered sequentially from left to right, indicate in the response section the number of the person(s) in focus:", and the response section includes instructions to spell a response in a response box 212a. However, the details of the instruction section 210 and/or the response section 212 in the challenge-response authentication 206 of FIGS. 2a, 2b, and 2c are meant to be merely exemplary, and one of skill in the art will recognize that a variety of instruction sections and response sections that detail to the user what information about the image 208 should provided in the response box 212a will fall within the scope of the present disclosure.

In one embodiment, the image 208 in the challenge-response authentication 206 may be provided to the user device 202 such that one of a plurality of image objects in the image 208 is displayed on the user device display 204 in focus. For example, the image 208 may include a first image object 208a (e.g., the persons face at the far left of the image 208), a second image object 208*b* (e.g., the persons face in the middle of the image 208), and a third image object 208*c* (e.g., the persons face at the far right of the image 208). Thus, a user may be presented (through the user device display 204 on the user device 202) with the image 208 having the first image object 208*a* in focus (e.g., the image 208 in FIG. 2*a*), the image 208 having the second image object 208*b* in focus (e.g., the image 208 in FIG. 2*b*), or the image 208 having the third image object 208*c* in focus (e.g., the image 208 in FIG. 2*c*).

In another embodiment, the image 208 in the challenge-response authentication 206 may be provided to the user device 202 with a focal point of the image 208 changing over time such that only one of the first image object 208*a*, the second image object 208*b*, and the third image object 208*c* is provided on the user device display 204 in focus at any given time. For example, a user may be presented (through the user device display 204 on the user device 202) with the image 208 having the first image object 208*a* in focus (e.g., the image 208 in FIG. 2*a*) for the first 10 seconds that the challenge-response authentication 206 is provided on the user device 202, the image 208 with the second image object 208*b* in focus (e.g., the image 208 in FIG. 2*b*) for the second 10 seconds that the challenge-response authentication 206 is provided on the user device 202, and the image 208 with the third image object 208*c* in focus (e.g., the image 208 in FIG. 2*a*) for the third 10 seconds that the challenge-response authentication 206 is provided on the user device 202, after which the sequence of image objects which are presented in focus on the user device display 204 may be repeated.

In an embodiment, the sequence of image objects which are presented in focus may be predetermined. For example, a predetermined image object focus sequence may include presenting the first image object 208*a*, then second image object 208*b*, then third image object 208*c*, and then to repeat (as described above and illustrated in FIGS. 2*a*, 2*b*, and 2*c*). Predetermined image object focus sequences may include repeating the presentation of a particular image object in focus, reversing an image object focus sequence, etc., and one of skill in the art will recognize that any predetermined image object focus sequences, including initial random sequences, randomly repeated sequences, any combinations of random and non-random sequences, will fall within the scope of the present disclosure. In an embodiment, the amount of time image objects are presented in focus may be performed by the challenge-response authentication 206 according to a predetermined timing schedule. For example, a predetermined timing sequence may include presenting each object in focus for 10 seconds (as described above.) Predetermined timing sequences may include presenting image objects in focus for different amounts of time, rapidly shifting the focus of the image between three or more image objects, etc., and one of skill in the art will recognize that any predetermined timing sequences will fall within the scope of the present disclosure. In an embodiment, the authentication device may select the predetermined image object focus sequence and/or the predetermined timing sequence for the challenge-response authentication provided on the user device 200 from a plurality of predetermined image object focus sequences and/or predetermined timing sequences.

Figure 3:
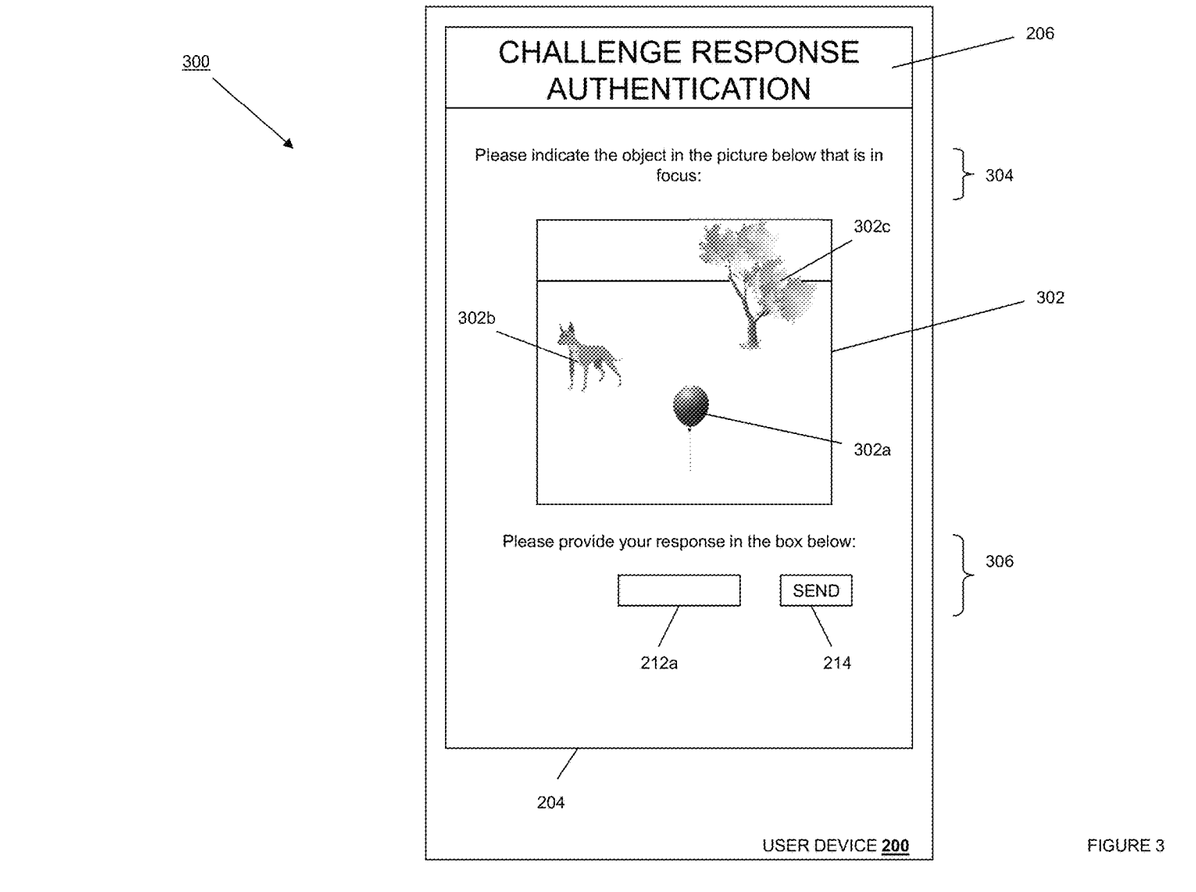
FIG. 3 is a front view illustrating an embodiment of a user device being used to make an access attempt.

Referring now to FIG. 3, an embodiment of a focus-based challenge-response authentication system 300 is illustrated that is substantially similar to the focus-based challenge-response authentication system 200 discussed above with reference to FIGS. 2*a*, 2*b*, and 2*c*, but with the provision of a modified image 302, instruction section 304, and response section 306 in place of the image 208, instruction section 210, and response section 212. In the embodiment illustrated in FIG. 3, the instruction section 304 includes the following instruction "Please indicate the object in the picture below that is in focus:", and the response section includes instructions to provide a response in the response box 212*a*. However, the details of the instruction section 304 and/or the response section 306 are meant to be merely exemplary, and one of skill in the art will recognize that a variety of instruction sections and response sections that detail to the user what information about the image 302 should provided in the response box 212*a* will fall within the scope of the present disclosure.

In the embodiment illustrated in FIG. 3, the image 302 is again a plenoptic image. However, in this example, the image 302 includes a first image object 302*a* (the balloon in the image 302), a second image object 302*b* (the dog in the image 302), and a third image object 302*c* (the tree in the image 302.) As discussed above with the image 208, the image 302 may be provided to the user device 202 at block 104 of the method 100 such that only one of the first image object 302*a*, the second image object 302*b*, or the third image object 302*c* is displayed on the user device display 204 in focus. As also discussed above with the image 208, the image 302 may be provided to the user device 202 at block 104 of the method 100 with a focal point of the image 302 changing over time such that only one of the first image object 302*a*, the second image object 302*b*, and the third image object 302*c* is provided on the user device display 204 in focus at any given time. Furthermore, the predetermined image object focus sequences and/or the predetermined timing sequences may be used with the image 302 as well.

Figure 4:
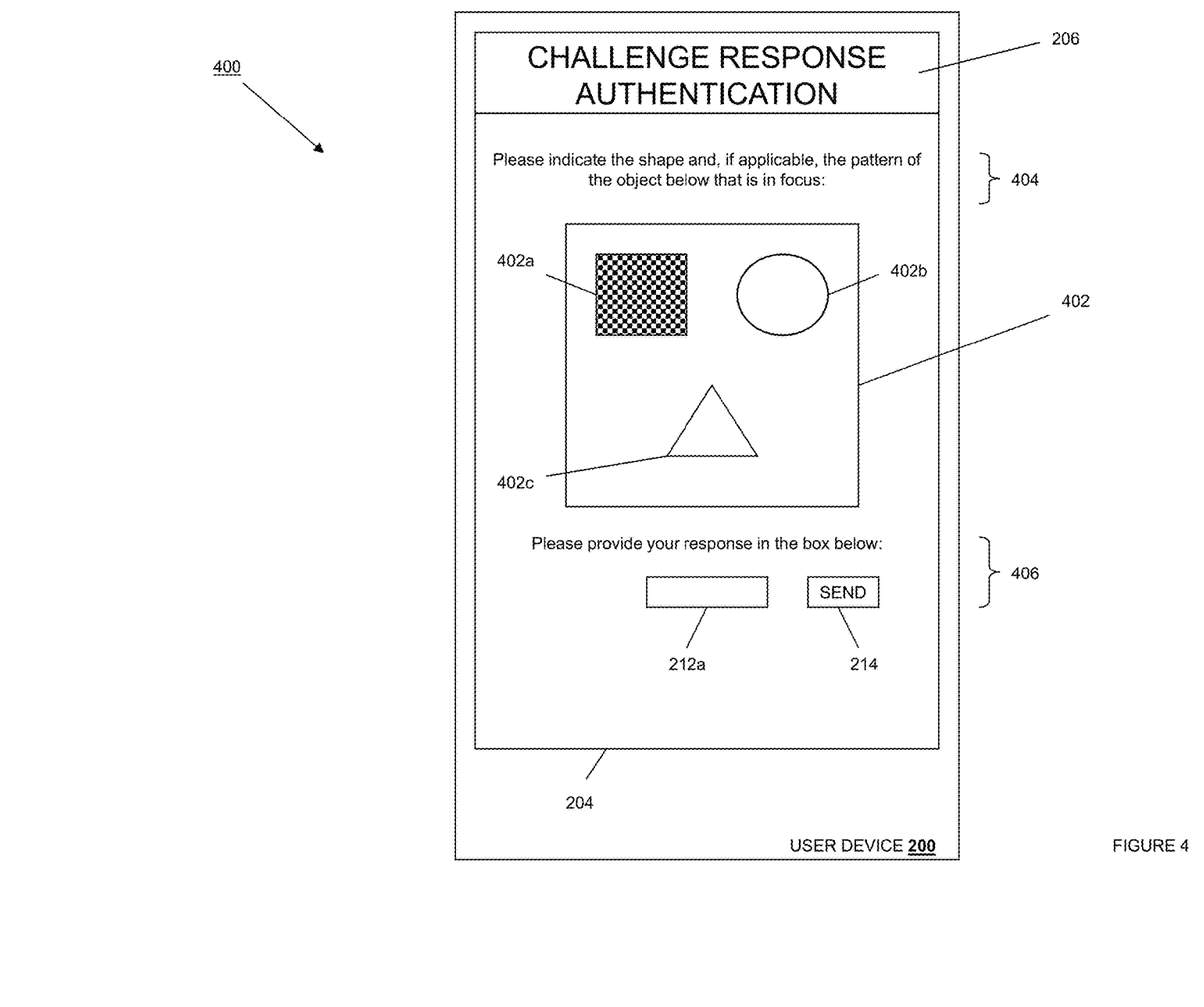
FIG. 4 is a front view illustrating an embodiment of a user device being used to make an access attempt.

Referring now to FIG. 4, an embodiment of a focus-based challenge-response authentication system 400 is illustrated that is substantially similar to the focus-based challenge-response authentication system 200 discussed above with reference to FIGS. 2*a*, 2*b*, and 2*c*, but with the provision of a modified image 402, instruction section 404, and response section 406 in place of the image 208, instruction section 210, and response section 212. In the embodiment illustrated in FIG. 4, the instruction section 404 includes the following instruction "Please indicate the shape and, if applicable, the pattern of the object below that is in focus:", and the response section includes instructions to provide a response in the response box 212*a*. However, the details of the instruction section 404 and/or the response section 406 are meant to be merely exemplary, and one of skill in the art will recognize that a variety of instruction sections and response sections that detail to the user what information about the image 402 should provided in the response box 212*a* will fall within the scope of the present disclosure.

In the embodiment illustrated in FIG. 4, the image 402 is not a plenoptic image like the images 208 and 302, discussed above. The image 402 includes a first image object 402*a* (the square with the checkerboard pattern in the image 402), a second image object 402*b* (the circle in the image 402), and a third image object 402*c* (the triangle in the image 402). Similarly as discussed above with the images 208 and 302, but without using plenoptic image techniques, the image 402 may be provided to the user device 202 at block 104 of the method 100 such that only one of the first image object 402*a*, the second image object 402*b*, or the third image object 402*c* is displayed on the user device display 204 in focus. Also similarly as discussed above with the images 208 and 302, but without using plenoptic image techniques, the image 402 may be provided to the user device 202 at block 104 of the method 100 with the image object that is in focus changing over time such that only one of the first image object 402*a*, the second image object 402*b*, and the third image object 402*c* is provided on the user device display 204 in focus at any given time. Furthermore, the predetermined image object focus sequences and/or the predetermined timing sequences may be used with the image 402 as well.

In an embodiment, the instruction section, response section, and send button on each of the challenge response authentications 206 illustrated in FIGS. 2*a*, 2*b*, 2*c*, 3, and 4 may be modified to simply instruct a user to select the image object in the image that is in focus (e.g., by using an input device such as a mouse to 'click on' or select the portion of the image that includes the image object that is in focus.

The method 100 then proceeds to block 106 where an authentication response is received. In an embodiment, in response to receiving the challenge-response authentication at block 104 of the method 100, the user uses the user device 202 to provide a response in the response section 212*a* and then selects the send button 214 to send an authentication response over the network to the authentication device. In another embodiment, in response to receiving the challenge-response authentication at block 104 of the method 100, the user uses the user device 202 to select a portion of the image in the challenge-response authentication that includes the image object that is in focus, which results in an authentication response that includes the selection of the portion of the image being sent over the network to the authentication device.

The method 100 then proceeds to decision block 108 where it is determined whether the authentication response includes an indication of image object(s) that are in focus. In response to receiving the authentication response over the network from the user device, the authentication device analyzes the authentication response to determine whether it includes an indication of an image object known or determined to be in focus in the challenge response authentication that was sent in block 104. The authentication device may retrieve information from one or more databases to perform the analysis on the authentication response. If the authentication response indicates the appropriate image object(s) that was/were in focus, the method 100 proceeds to block 110 where the access attempt by the user device is authenticated. If the authentication response indicates an image object(s) that was/were not in focus, the method 100 proceeds to block 112 where the access attempt by the user device is denied.

In one example, the embodiment illustrated in FIGS. 2*a*, 2*b*, and 2*c* is used where the image 208 was provided and displayed on the user device display 204 with only one of the first image object 208*a*, second image object 208*b*, or third image object 208*c* in focus. In such an embodiment, the authentication device will know which image was provided and thus will know which image object in the image is in focus.

For the image 208 illustrated in FIG. 2*a*, the authentication device will know that the image object 208*a* is in focus, and will make the determination at decision block 108 that the authentication response includes an indication of the image object that is in focus if the authentication response includes the words and/or character strings "one", "first", etc. For the image 208 illustrated in FIG. 2*b*, the authentication device will know that the image object 208*b* is in focus, and will make the determination at decision block 108 that the authentication response includes an indication of the image object that is in focus if the authentication response includes the words and/or character strings "two", "second", etc. For the image 208 illustrated in FIG. 2*c*, the authentication device will know that the image object 208*c* is in focus, and will make the determination at decision block 108 that the authentication response includes an indication of the image object that is in focus if the authentication response includes the words and/or character strings "three", "third", etc.

In another example, the embodiment illustrated in FIGS. 2*a*, 2*b*, and 2*c* is used where the image 208 was provided and displayed on the user device display 204 with a focal point of the image 208 changing over time such that only one of the first image object 208*a*, the second image object 208*b*, and the third image object 208*c* was provided on the user device display 204 in focus at any given time. In such an embodiment, the authentication device determines which of the image objects in the image 208 was in focus when the authentication response was provided by the user.

For example, upon the image 208 being presented on the user device display 204 at block 104 of the method 100, the challenge-response authentication may begin a predetermined image object focus sequence and predetermined timing sequence to provide the image objects 208*a*, 208*b*, and 208*c* in focus in the image 208 at different times. The challenge-response authentication 206 may be operable to begin a timing mechanism when the image 208 is first presented on the user device display 204 such that a authentication response time, which may measure the time elapsed between the providing of the challenge-response authentication 206 to the user device display 204 and the sending of the authentication response by the user, is recorded when the authentication response is sent. At block 106, along with the authentication response, the authentication device may receive the authentication response time. Then at block 108, the authentication device may retrieve the predetermined image object focus sequence and predetermined timing sequence for the image that was provided in block 104 if the method 100. The authentication device may then use the authentication response time to determine, according to the predetermined timing schedule, where in the predetermined image object focus sequence the challenge-response authentication was when the authentication response was sent to determine which of the image objects in the image 208 was in focus on the user device display 204 when the authentication response was sent. The authentication device may then compare that against the authentication response to determine at decision block 108 whether the authentication response includes an indication of the image object that was in focus when the authentication response was sent.

In another embodiment, the authentication response includes a selection of a portion of the image 208 as discussed above. The authentication device may know or be operable to determine which of the image objects was in focus when the authentication response was provided, e.g., using the techniques discussed above where the image 208 was provided and displayed on the user device display 204 with only one of the image objects in focus, or where the image 208 was provided and displayed on the user device display 204 with a focal point of the image 208 changing over time such that one of the image objects was provided on the user device display 204 in focus at any given time. By using the information about which image object was in focus when the authentication response was sent, the authentication device may determine which portions of the image are associated with that image object. The authentication device may then compare that information to the authentication response to determine whether the selection of the portion of the image 208 in the authentication response indicates the image object that was in focus when the authentication response was sent.

For example, for the image 208 illustrated in FIG. 2a, the authentication device will know or determine that the image object 208a was in focus, and will make the determination at decision block 108 that the authentication response includes an indication of the image object that was in focus if the authentication response includes a selection of a portion of the image 208 that is known to include the image object 208a. For the image 208 illustrated in FIG. 2b, the authentication device will know or determine that the image object 208b was in focus, and will make the determination at decision block 108 that the authentication response includes an indication of the image object that was in focus if the authentication response includes a selection of a portion of the image 208 that is known to include the image object 208b. For the image 208 illustrated in FIG. 2c, the authentication device will know or determine that the image object 208c was in focus, and will make the determination at decision block 108 that the authentication response includes an indication of the image object that was in focus if the authentication response includes a selection of a portion of the image 208 that is known to include the image object 208c.

In another example, the image 302 described above with reference to FIG. 3 may have been provided at block 104 of the method 100, either with only one of the first image object 302a, second image object 302b, or third image object 302c in focus, or with a focal point of the image 302 changing over time such that only one of the first image object 302a, the second image object 302b, and the third image object 302c was provided on the user device display 204 in focus at any given time. The authentication device and/or user device may operate substantially as discussed above for the image 208 at decision block 108, with the exception that the authentication responses "balloon" (or a selection of a portion of the image 302 that includes the balloon) will result in an authenticated access attempt when the first image object 302a was in focus, "dog" (or a selection of a portion of the image 302 that includes the dog) will result in an authenticated access attempt when the second image object 302b was in focus, and "tree" (or a selection of a portion of the image 302 that includes the tree) will result in an authenticated access attempt when the third image object 302c was in focus.

In another example, the image 402 described above with reference to FIG. 4 may have been provided at block 104 of the method 100, either with only one of the first image object 402a, second image object 402b, or third image object 402c in focus, or with a focal point of the image 402 changing over time such that one of the first image object 402a, the second image object 402b, and the third image object 402c was provided on the user device display 204 in focus at any given time. The authentication device and/or user device may operate substantially as discussed above for the images 208 and 302 at decision block 108, with the exception that the authentication responses "square checkerboard" (or a selection of a portion of the image 302 that includes the checkerboarded square) will result in an authenticated access attempt when the first image object 402a was in focus, "circle" (or a selection of a portion of the image 302 that includes the circle) will result in an authenticated access attempt when the second image object 402b was in focus, and "triangle" (or a selection of a portion of the image 302 that includes the triangle) will result in an authenticated access attempt when the third image object 402c was in focus.

While the examples above discuss a single image object in the image of the challenge-response authentication being provided to the user on the user devices display in focus, various subsets (e.g., more than one) of the image objects in a given image may be provided in focus. Thus, a variety of focus-based challenge-response authentications may be provided that require the user to indicate the subset of image objects of a plurality of image objects that are in focus in an image. For example, an instruction for a challenge-response authentication may include "how many of the objects in the image below are in focus?", and proper responses may range from "none" or "zero", to a number of image objects, to "all", etc.

Thus, a system and method are discussed that provide an image to a user device with only a subset of a plurality of image objects that are included in the image in focus. A user using the user device is asked to identify and/or provide an indication of the subset of the plurality of image objects that are in focus. An authentication device either knows or is operable to determine the subset of the image objects in focus in the image provided to the user device, and compares that to the indication by the user to determine whether to authenticate the access attempt. Note that "focus" does not require complete focus or clarity, as this may vary depending on a user's display device, a user's eyesight, lighting, etc. The one or more object images in "focus" may be the one or ones that are the most clear, such that the "correct" image for authentication is still blurry, but not as much as the other images.

Figure 5:
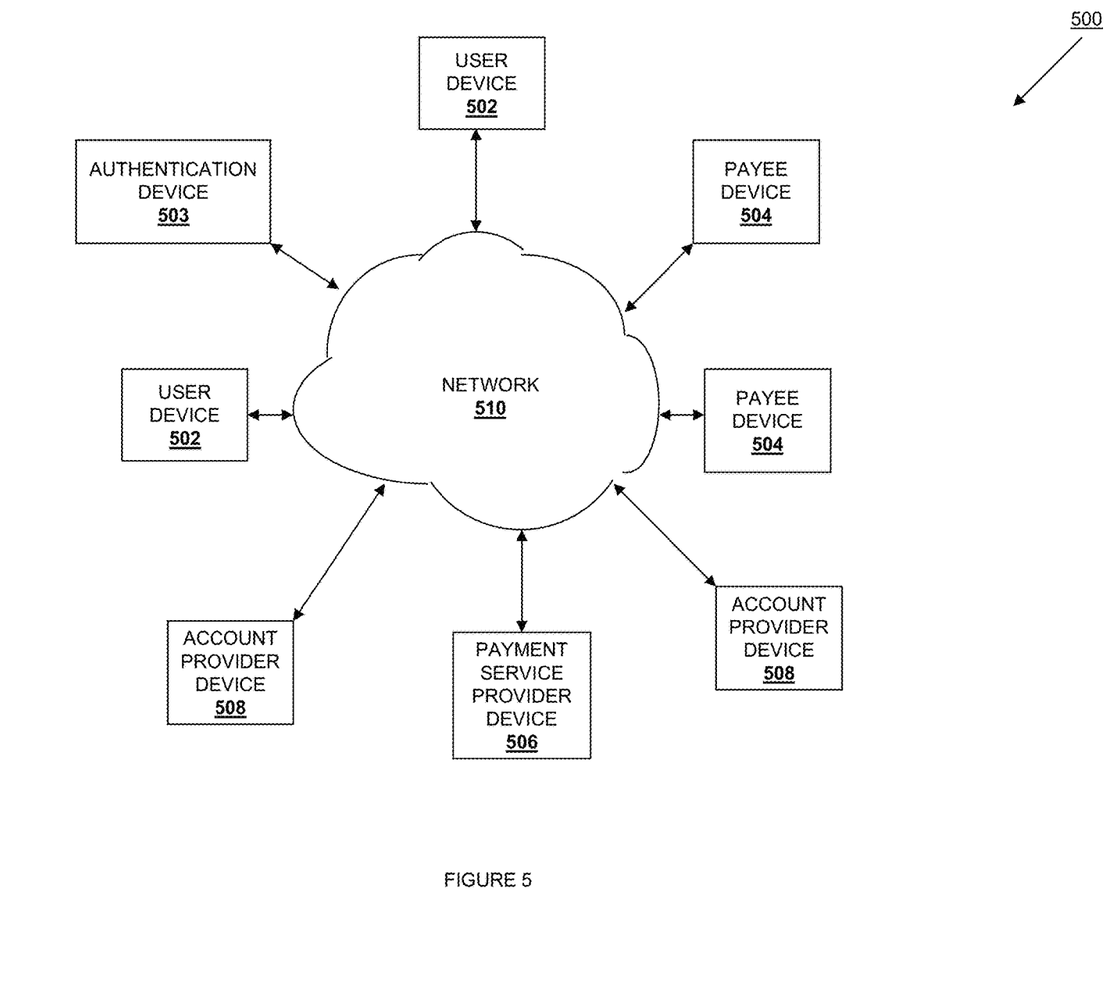
FIG. 5 is a schematic view illustrating an embodiment of a networked system.

Referring now to FIG. 5, an embodiment of a networked system 500 used in the payment system described above is illustrated. The networked system 500 includes a plurality of user devices 502, an authentication device 503, a plurality of payee devices 504, a payment service provider device 506, and a plurality of account provider devices 508 in communication over a network 510. Any of the user devices 502 may be the user device 202, discussed above. The authentication device 503 may be the authentication device discussed above and may be included in any of the payee device 504, the payment service provider device 506, and/or the accountholder device 508. The payee devices 504 may be operated by the payees discussed herein. The payment service provider device 506 may be operated by a payment service provider such as, for example, PayPal Inc. of San Jose, Calif. The account provider devices 508 may be operated by account providers such as, for example, credit card account providers, bank account providers, savings account providers, and a variety of other account providers known in the art.

The user devices 502, authentication device 503, payee devices 504, payment service provider device 506, and account provider devices 508 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 500, and/or accessible over the network 510.

The network 510 may be implemented as a single network or a combination of multiple networks. For example, in various embodiments, the network 510 may include the Internet and/or one or more intranets, landline networks, wireless networks, and/or other appropriate types of networks.

The user device 502 may be implemented using any appropriate combination of hardware and/or software configured for wired and/or wireless communication over network 510. For example, in one embodiment, the user device 502 may be implemented as a personal computer of a user in communication with the Internet. In other embodiments, the user device 502 may be a smart phone, personal digital assistant (PDA), laptop computer, and/or other types of computing devices.

The user device 502 may include one or more browser applications which may be used, for example, to provide a convenient interface to permit the user to browse information available over the network 510 and access websites, applications, and/or other network services. For example, in one embodiment, the browser application may be implemented as a web browser configured to view information available over the Internet.

The user device 502 may also include one or more toolbar applications which may be used, for example, to provide user-side processing for performing desired tasks in response to operations selected by the user. In one embodiment, the toolbar application may display a user interface in connection with the browser application.

The user device 502 may further include other applications as may be desired in particular embodiments to provide desired features to the user device 502. In particular, the other applications may include a payment application for payments assisted by a payment service provider through the payment service provider device 506. The other applications may also include security applications for implementing user-side security features, programmatic user applications for interfacing with appropriate application programming interfaces (APIs) over the network 510, or other types of applications. Email and/or text applications may also be included, which allow the user to send and receive emails and/or text messages through the network 510. The user device 502 includes one or more user and/or device identifiers which may be implemented, for example, as operating system registry entries, cookies associated with the browser application, identifiers associated with hardware of the user device 502, or other appropriate identifiers, such as a phone number. In one embodiment, the user identifier may be used by the payment service provider device 506 and/or account provider device 508 to associate the user with a particular account.

The payee device 504 may be maintained, for example, by a conventional or on-line merchant, conventional or digital goods seller, individual seller, and/or application developer offering various products and/or services in exchange for payment to be received conventionally or over the network 510. In this regard, the payee device 504 may include a database identifying available products and/or services (e.g., collectively referred to as items) which may be made available for viewing and purchase by the payer.

The payee device 504 also includes a checkout application which may be configured to facilitate the purchase by the payer of items. The checkout application may be configured to accept payment information from the user through the user device 502, the account provider through the account provider device 508, and/or from the payment service provider through the payment service provider device 506 over the network 510.

Figure 6:
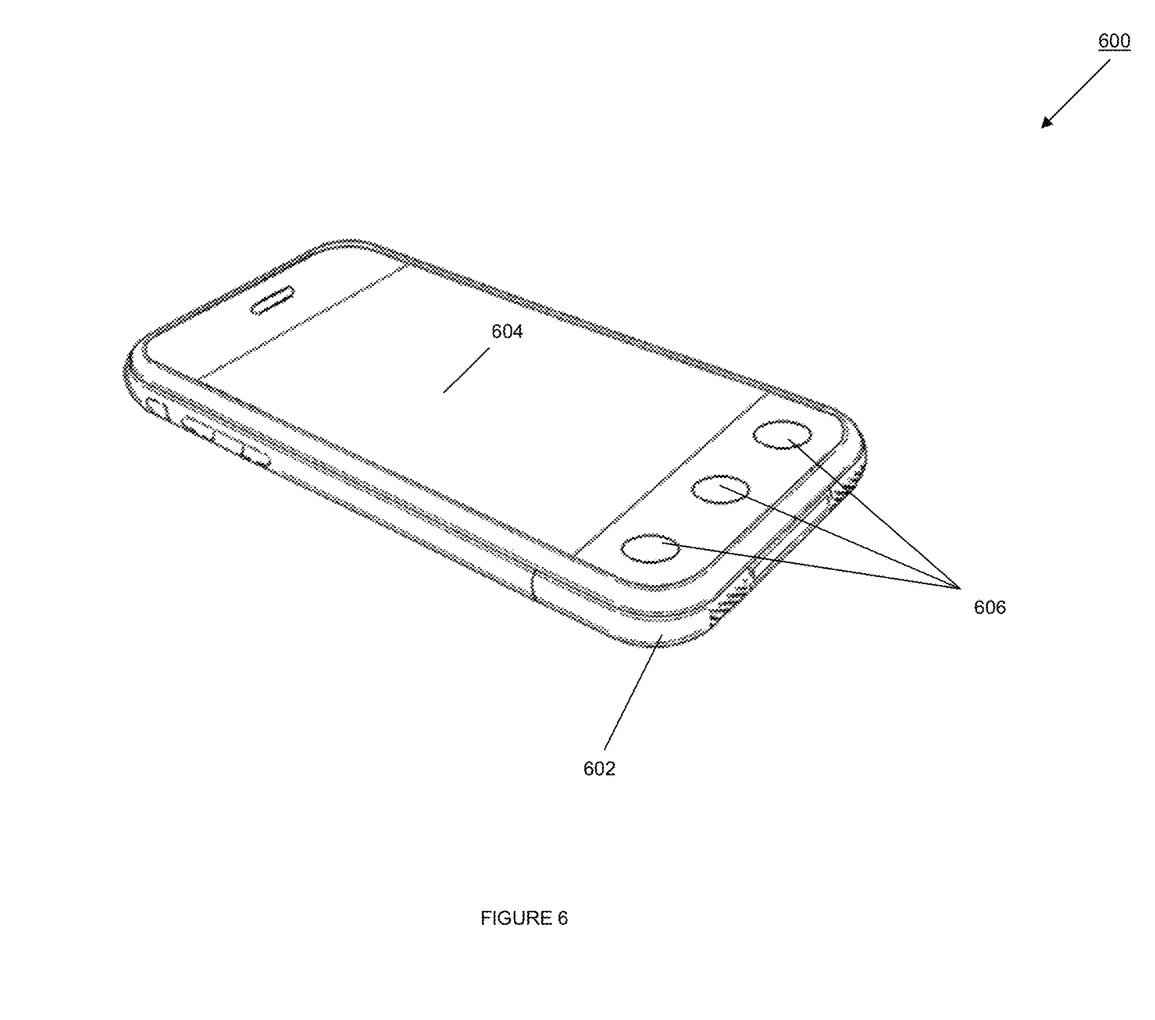
FIG. 6 is a perspective view illustrating an embodiment of a user device.

Referring now to FIG. 6, an embodiment of a user device 600 is illustrated. The user device 600 may be the user devices 202 and/or 502. The user device 600 includes a chassis 602 having a display 604 and an input device including the display 604 and a plurality of input buttons 606. One of skill in the art will recognize that the user device 600 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 7:
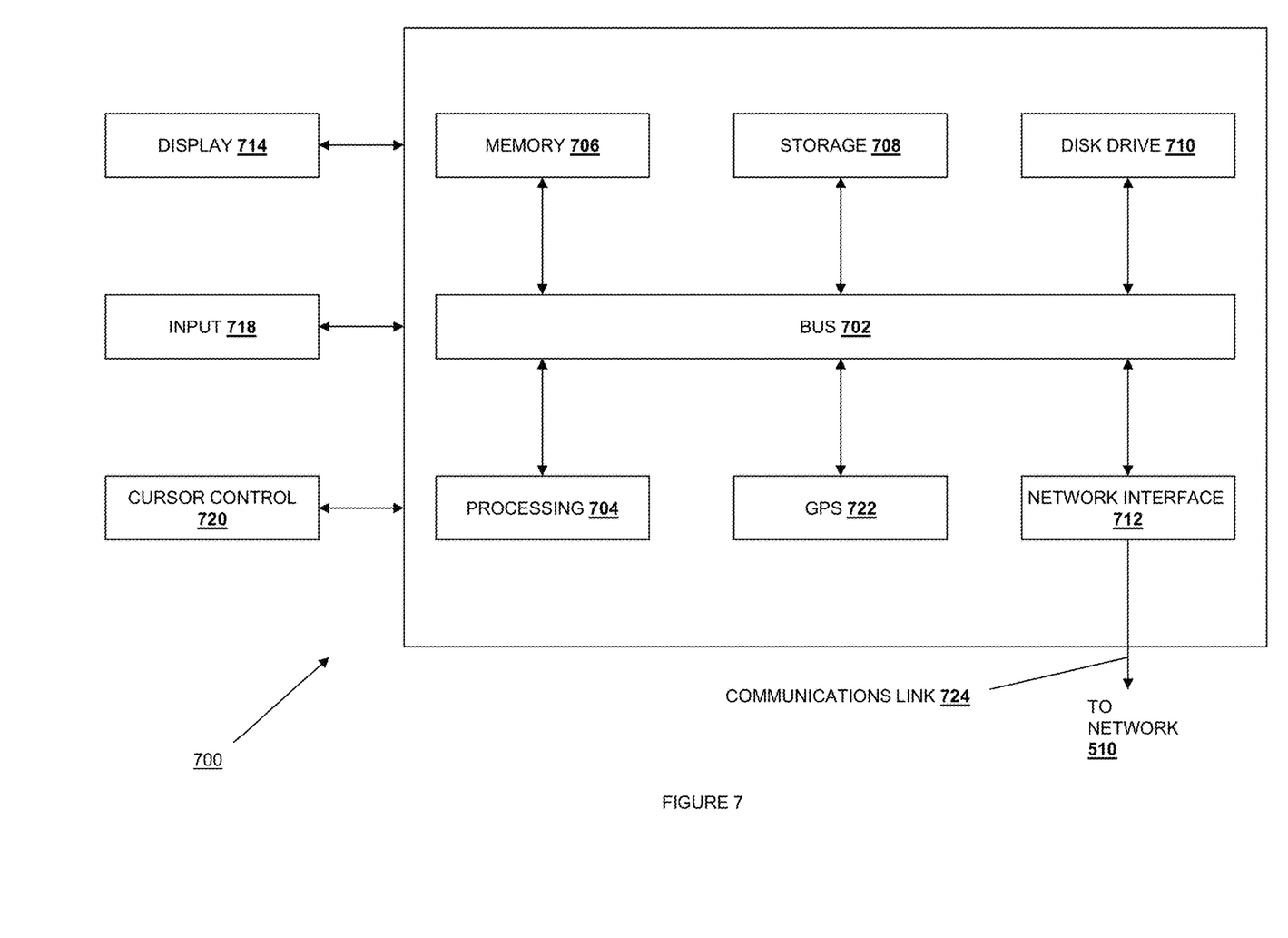
FIG. 7 is a schematic view illustrating an embodiment of a computer system.

Referring now to FIG. 7, an embodiment of a computer system 700 suitable for implementing, for example, the user devices 202, 502, and 600, the authenticating device 503, the payees device 504, the payment service provider device 506, and/or the account provider device 508, is illustrated. It should be appreciated that other devices utilized by users, payees, payment service providers, and account providers in the payment system discussed above may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processing component 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), and/or a location determination component 722 (e.g., a Global Positioning System (GPS) device as illustrated, a cell tower triangulation device, and/or a variety of other location determination devices known in the art.) In one implementation, the disk drive component 710 may comprise a database having one or more disk drive components.

In accordance with embodiments of the present disclosure, the computer system 700 performs specific operations by the processor 704 executing one or more sequences of instructions contained in the memory component 706, such as described herein with respect to the user device 202, 502, and 600, the authentication device 503, the payee device(s) 504, the payment service provider device 506, and/or the account provider device(s) 508. Such instructions may be read into the system memory component 706 from another computer readable medium, such as the static storage component 708 or the disk drive component 710. In other embodiments, hard-wired circuitry may be used in place of or in combination with software instructions to implement the present disclosure.

Logic may be encoded in a computer readable medium, which may refer to any medium that participates in providing instructions to the processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 700. In various other embodiments of the present disclosure, a plurality of the computer systems 700 coupled by a communication link 724 to the network 510 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Figure 8:
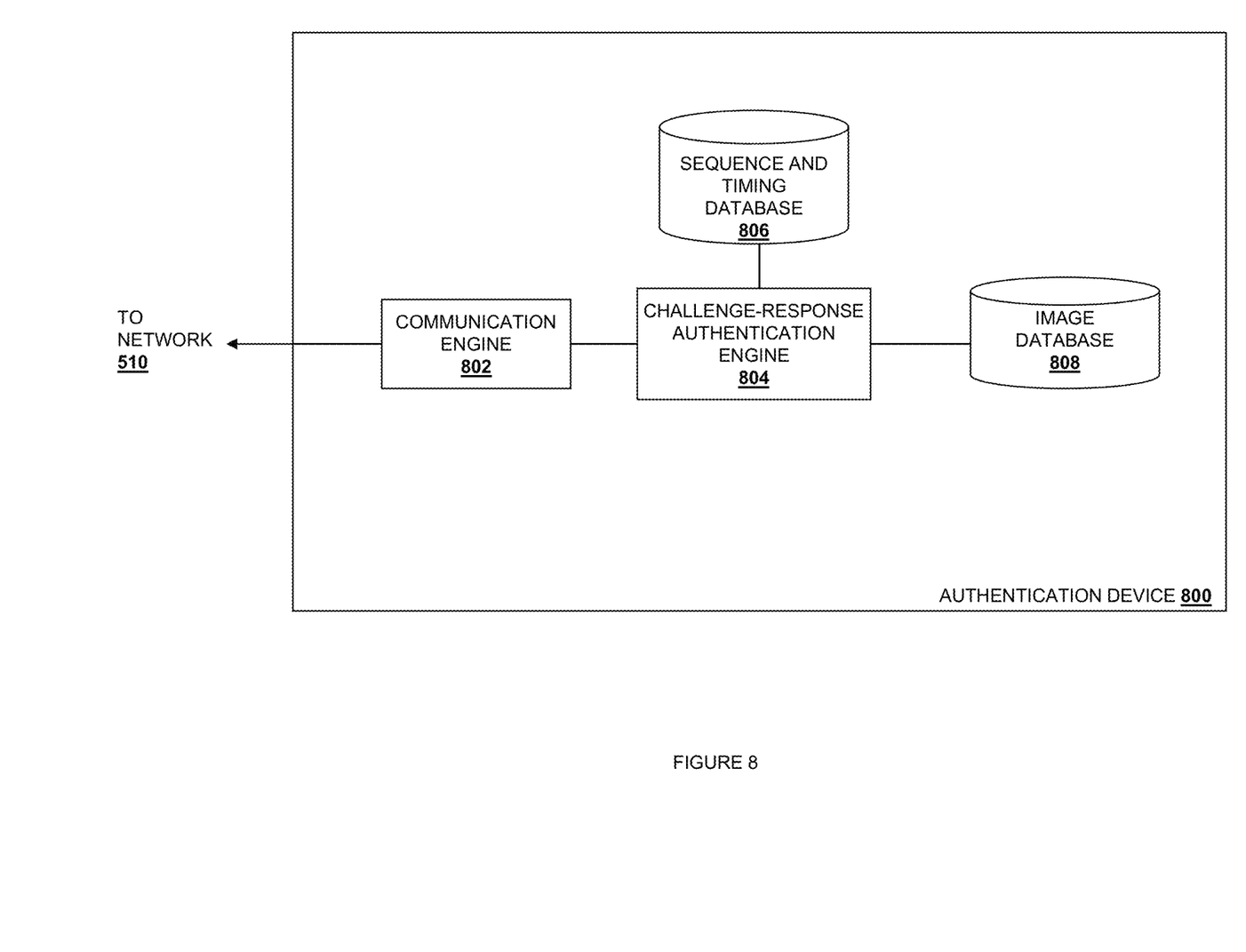
FIG. 8 is a schematic view illustrating an embodiment of an authentication device.

Referring now to FIG. 8, an embodiment of a authentication device 800 is illustrated. In an embodiment, the device 800 may be the authentication device 503, payment service provider device 506, the payee device 504, and/or the account holder device 508. The device 800 includes a communication engine 802 that is coupled to the network 510 and to a challenge-response authentication engine 804 that is coupled to each of a sequence and timing database 806 and an image database 808. The communication engine 802 may be software or instructions stored on a computer-readable medium that, when executed by a processor, allows the device 800 to send and receive information over the network 510. The challenge-response authentication engine 804 may be software or instructions stored on a computer-readable medium that, when executed by a processor, allows the device 800 to retrieve images from the image database 808, retrieve sequence and timing information for the retrieved image from the sequence and timing database 806, send the image and the sequence and timing information to the communications engine 802, receive authentication responses, determine whether the authentication responses correctly indicate image objects that are in focus in an image provided in a challenge response authentication, and/or provide a plurality of other functions discussed above. While the databases 806 and 808 has been illustrated as located in the authentication device 800, one of skill in the art will recognize that they may be connected to the challenge-response authentication engine 804 through the network 510 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users, payees, payment service providers, and account holders; however, a user may attempt access and being authenticated by a variety of other entities. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for testing a user, comprising:

providing a user test on a display of a testing device, wherein the user test includes depth information and a testing image having a first image object and a second image object, and wherein the user test is configured to:

display the testing image such that the first image object is more in locus than the second image object; and use the depth information to change a focus of the testing image between the first image object and the second image object such that, following the display of the testing image, the second image object is more in focus than the first image objet;

receiving, in response to providing the testing image, an object designation response at a first time from an input device coupled to the testing device; and determining whether the object designation response includes an indication of or information about the one of the first image object or the second image object that was more in focus at the first time.

2. The method of claim 1, wherein the testing image includes at least one third image object that is less in focus than the first image object or the second image object.

3. The method of claim 1, wherein the testing image includes a plenoptic image.

4. The method of claim 1, wherein the testing image is displayed such that different ones of the first image object and the second image object are more in focus over time according to a predetermined timing schedule.

5. The method of claim 4, wherein the determining further comprises:

retrieving the predetermined timing schedule;

determining that the first image object was scheduled to be more in focus at the first time than the second image object according to the predetermined timing schedule; and determining whether the object designation response includes an indication of the first image object that was scheduled to be more in focus at the first time than the second image object according to the predetermined timing schedule.

6. The method of claim 1, wherein the user test includes an instruction to provide an indication of or information about the one of the first image object or the second image object that is more in focus.

7. The method of claim 1, wherein the user test is configured to display the testing image such that different ones of the first image object and the second image object are at different levels of focus in a sequence that is random.

8. The method of claim 1, wherein the object designation response includes a selection of a portion of the testing image, and wherein the determining includes:

determining whether the selected portion of the testing image indicates the one of the first image object and the second image object that was more in focus at the first time.

9. A non-transitory, machine-readable medium having stored thereon machine-readable instructions executable to cause machine to perform operations comprising:

configuring a testing image display module that displays a testing image having a first image object and a second image object on a display device of the testing device, wherein the testing image display module;

displays the testing image such that the first image object is more in focus than the second image object; and accesses depth information and uses the depth information to change a focus of the testing image between the first image object and the second image object such that the second image object is more in focus than the first image object;

configuring a receiving module that receives an object designation response at a first time from an input device coupled to the testing device; and configuring a determination module that determines whether the object designation response includes an indication of or information about one of the first image object or the second image object that was more in focus at the first time.

10. The non-transitory, machine-readable medium of claim 9, wherein the testing image includes at least one third image object that is less in focus than the first image object or the second image object.

11. The non-transitory, machine-readable medium of claim 9, wherein the testing image includes a plenoptic image.

12. The non-transitory, machine-readable medium of claim 9, wherein the testing image display module displays the testing image such that different ones of the first image object and the second image object are more in focus over time according to a predetermined timing schedule.

13. The non-transitory, machine-readable medium of claim 12, wherein the determination module:

retrieves the predetermined timing schedule;

determines that the first image object was scheduled to be more in focus at the first time than the second image object according to the predetermined timing schedule; and determines whether the object designation response includes an indication of the first image object that was scheduled to be more in focus at the first time than the second image object according to the predetermined timing schedule.

14. The non-transitory, machine-readable medium of claim 9, wherein the testing image display module displays the testing image such that the first image object and the second image object are in different levels of focus in a sequence that is random.

15. The non-transitory, machine-readable medium of claim 9, wherein the object designation response includes a selection of a portion of the testing image, and wherein the determination module:

determines whether the selected portion of the testing image indicates the one of the first image object or the second image object that was more in focus at the first time.

16. A user testing system, comprising:

a display device;

an input device;

a non-transitory memory system storing user testing instructions, depth information, and a testing image having a first image object and a plurality of second image objects; and a user test module that is coupled to the display device, the input device, and the non-transitory memory, wherein the user test module is configured to execute the user testing instructions to:

retrieve the testing image from the non-transitory memory system;

display the testing image on the display device such that the first image object is more in focus than the plurality of second image objects;

use the depth information to change a focus of the testing image such that at least one of the plurality of second image objects is more in focus than the first image object;

receive an object designation response at a first time from the input device; and determine whether the object designation response includes an indication of or information about the first image object or the at least one of the plurality of second image objects that was more in focus at the first time.

17. The system of claim 16, wherein the testing image includes a plenoptic image.

18. The system of claim 16, wherein the wherein the user test module is configured to execute the user testing instructions to:

provide for display an instruction to provide an indication of or information about the first image object or the at least one of the plurality of second image objects that is more in focus at the first time.

19. The system of claim 16, wherein the non-transitory memory system stores a predetermined timing schedule, and wherein the user testing module is configured to execute the user testing instructions to display the testing image such that different ones of the first image object and the plurality of second image object are more in focus over time according to the predetermined timing schedule.

20. The system of claim 19, wherein the user test module is configured to execute the user testing instructions to:
- retrieve the predetermined timing schedule from the non-transitory memory system;
- determine that the first image object was scheduled to be more in focus at the first time than the plurality of second image objects according to the predetermined timing schedule; and
- determine whether the object designation response includes an indication of the first image object that was scheduled to be more in focus at the first time than the plurality of second image objects according to the predetermined timing schedule.

* * * * *

UNITED STATES PATENT AND TRADEMARK OFFICE
CERTIFICATE OF CORRECTION

PATENT NO. : 9,824,357 B2
APPLICATION NO. : 14/510777
DATED : November 21, 2017
INVENTOR(S) : Frank Anthony Nuzzi Page 1 of 1

It is certified that error appears in the above-identified patent and that said Letters Patent is hereby corrected as shown below:

In the Claims

In Claim 1, Column 14, Line 43: please replace "locus" with --focus--;

In Claim 1, Column 14, Line 49: please replace "objet" with --object--.

Signed and Sealed this
Thirty-first Day of July, 2018

Andrei Iancu
*Director of the United States Patent and Trademark Office*